(12) United States Patent
Odru

(10) Patent No.: US 6,338,365 B1
(45) Date of Patent: *Jan. 15, 2002

(54) FLEXIBLE PIPING STRUCTURE HAVING A CONTINUOUS METAL INNER TUBE

(75) Inventor: Pierre Odru, Fontenay Sous Bois (FR)

(73) Assignee: Institut Francais du Petrole, Rueil-Malmaison Cedex (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/630,811

(22) Filed: Aug. 2, 2000

Related U.S. Application Data

(63) Continuation-in-part of application No. 09/156,045, filed on Sep. 17, 1998, now Pat. No. 6,098,667.

(30) Foreign Application Priority Data

Sep. 18, 1997 (FR) .............................. 97 11737

(51) Int. Cl.⁷ .............................. F16L 11/00; F16L 11/16
(52) U.S. Cl. ........................ 138/134; 138/131; 138/135; 138/139
(58) Field of Search ................... 138/134, 135, 138/139, 143, 131

(56) References Cited

U.S. PATENT DOCUMENTS

| | | | |
|---|---|---|---|
| 4,344,462 A | 8/1982 | Aubert et al. ............... | 138/135 |
| 4,597,276 A | 7/1986 | Legallais et al. ............... | 72/49 |
| 5,275,209 A | 1/1994 | Sugier et al. ................ | 138/135 |
| 5,406,984 A | 4/1995 | Sugier et al. ........... | 138/135 X |
| 5,645,110 A | 7/1997 | Nobileau ................ | 138/135 X |
| 5,669,420 A | 9/1997 | Herrero et al. ......... | 138/135 X |
| 5,730,188 A | 3/1998 | Kalman et al. ............. | 138/135 |
| 5,813,439 A * | 9/1998 | Herrero et al. ......... | 138/135 X |
| 5,934,335 A * | 8/1999 | Hardy ......................... | 138/131 |
| 6,006,788 A | 12/1999 | Jung et al. .................. | 138/131 |
| 6,065,501 A * | 5/2000 | Feret et al. ............ | 138/135 X |
| 6,085,799 A * | 7/2000 | Kodaissi et al. ............ | 138/135 |
| 6,098,667 A * | 8/2000 | Odru .......................... | 138/134 |
| 6,192,941 B1 * | 2/2001 | Mallen-Herrero et al. .. | 138/135 |

FOREIGN PATENT DOCUMENTS

| | | |
|---|---|---|
| DE | 26 42 230 | 3/1978 |
| EP | 0 192 922 | 9/1986 |
| FR | 2 512 165 | 3/1983 |
| FR | 2 569 462 | 2/1986 |
| FR | 2 709 529 | 3/1995 |
| WO | 97/13091 | 4/1997 |

* cited by examiner

*Primary Examiner*—Patrick Brinson
(74) *Attorney, Agent, or Firm*—Millen, White, Zelano & Branigan, P.C.

(57) ABSTRACT

A flexible piping structure has in combination, from the axis of the pipe towards the exterior, a cylindrical, metal inner sealing tube, a layer resistance to internal and external pressures and a sealing sheath made from extruded plastics material. In one embodiment, an intermediate layer of plastics material is arranged between the tube and the pressure-resistant layer.

17 Claims, 2 Drawing Sheets

FLEXIBLE PIPING STRUCTURE HAVING A CONTINUOUS METAL INNER TUBE

RELATED APPLICATIONS

This application is a continuation-in-part of U.S. application Ser. No. 09/156,045, filed on Sep. 17, 1998 now U.S. Pat. No. 6,098,667.

FIELD OF THE INVENTION

Flexible, reinforced piping, particularly that used to convey petroleum effluents, conventionally has sealing sheaths made from thermoplastic materials, which offer the specific advantages of providing a high degree of mechanical deformation and being easy to use with extrusion processes.

However, they do have significant limitations, the main ones being:

limitations in terms of characteristics, depending on the temperature;

they are not fully impermeable to gas (due to diffusion over time), particularly in respect of $H_2S$, which gives rise to a serious problem since it can lead to corrosion of the metal materials placed on the exterior of these sheaths. These materials, used to make the reinforcement designed to withstand pressure and traction, must by definition retain their original characteristics over time.

Metal materials are known to be impermeable to gas and are able to withstand the maximum temperature which a petroleum effluent might reach without any major problem. However, they are not flexible or are only slightly flexible as compared with polymer plastics materials. However, there are numerous applications (coiled tubing for drilling, rigid piping which is unwound at sea for transporting petroleum effluents) where steel tubes can be bent across small radii of curvature, chiefly by deformation in the plastic domain of the material.

Attempts have been made in the past to use continuous corrugated tubing as a means of making the piping more flexible but in this case, the need to be able to withstand resistance to internal pressure means that for these applications, it is necessary to strengthen the hollows of the corrugations, using a composite fibre material impregnated with thermo-setting resin as a reinforcement.

The objective of the present invention is to provide a reinforced flexible pipe. The piping consists of a combination, from the axis of the pipe out towards the exterior, of a cylindrical metal, inner tube which provides a seal against the effluents conveyed by the pipe, a layer which is resistant to internal pressure and external pressure consisting of reinforcements wound in a small pitch spiral around said inner tube and a sealing sheath made from an extruded plastics material.

In one embodiment, the structure of the pipe may include an intermediate layer made from plastic and inserted between the inner tube and the pressure-resistant layer.

The intermediate layer may be extruded on said continuous tube.

The intermediate layer may consist of a strip wound around the continuous-tube.

The pipe may have at least one layer of reinforcement which is resistant to traction, disposed on the outside of the pressure-resistant layer. The sealing sheath may be disposed between the pressure-resistant reinforcing layer and the traction-resistant reinforcing layer.

The sealing sheath may be arranged on the exterior of the traction-resistant reinforcing layer.

The sealing sheath may be externally protected by a flexible metal layer, for example clamped strapping. The pipe may have two sealing sheaths, one directly on top of the pressure-resistant layer and the other above the layer of traction-resistant reinforcement.

The profile of the pressure-resistant strengthening may be T-shaped.

The structure of the flexible piping of the invention described below allows a thin cylindrical tube of a metal material, selected so as to be resistant to corrosion (for example stainless steel or titanium), to be inserted in a flexible assembly consisting of reinforcement resistant to pressure, both internal and external, reinforcement resistant to longitudinal forces and plastic sheaths, either external or inserted in the middle. Said flexible structure is of a size such that it will comply with specifications corresponding to the requirements for pipe-laying and servicing on the sea bed, this piping being substantially horizontal and used to convey corrosive effluents. In most cases, said flexible tubing is laid in a trench (known as a "bed") and then covered with materials designed to prevent, the flex-pipe from buckling, i.e. from extending and creating vertical loops under the force of the internal pressure whilst the two ends remain blocked.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

The present invention will be more readily understood and its advantages will become clearer from the following description of structures used for flexible piping, illustrated by the appended drawings, in which:

In FIG. 1, reference 1 denotes an internal metal liner which is impermeable to gas and capable of withstanding temperature. By metal "liner" is meant here a thin-walled cylindrical tube, generally made from a continuous strip welded in the manner of a longitudinal cord or in a spiral. The quality of the welding is such that the tube is, impermeable to fluids at the test pressure to which flexible piping is subjected in accordance with the known standards in the profession. Clearly, given that it is not very thick, the liner itself does not withstand the test pressure as such in the same way as a plastic sealing sheath will not withstand the pressure on its own. The thin internal tube (liner) is made from a metal material which is resistant to corrosion, for example austenitic ferritic steel (UNS S31803), austenitic steel (UNS S31254) or nickel-based steel (N 06625) depending on the conditions under which it will be used. The typical thickness of the tube is within the range of between 0.5 and 3 mm.

Figure 2:
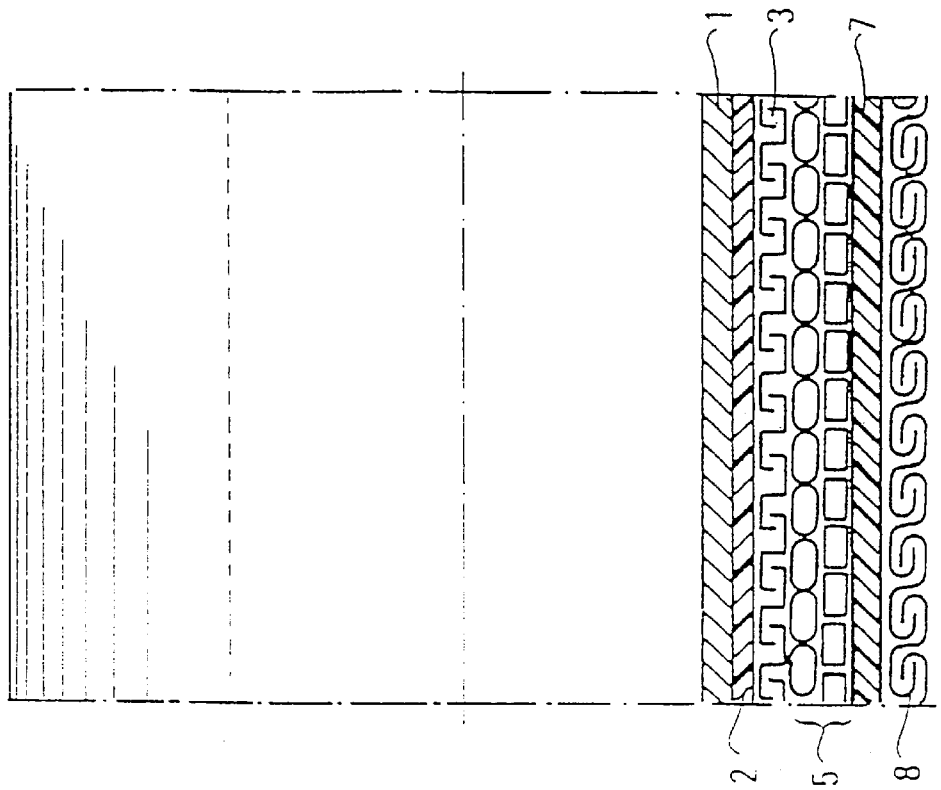
FIG. 2 shows another embodiment of a structure.

The mechanical nomenclatures and characteristics of the metals which can be considered are as follows:

stainless steel AISI 316L (reference UNS:S31603): elastic limit: >280 MPa, breaking point: 500 MPa;

austenitic ferritic steel 2205 (UNS:S31803):

elastic limit >450 MPa, breaking point. 680 to 880 MPa, elongation at break: >25%;

austenitic steel 6 Mo (UNS:S31254):
elastic limit: >300 MPa, breaking point: >650 MPa, elongation at break: >35%:

titanium non-alloy grade 2 (UNS:R50400) or 3(LINS:R50550):
elastic limit: >275 MPa, breaking point: >345 MPa, elongation at break in the order of 20%, modulus: 110 GPa.

The table below shows the level of deformation (% elongation) as a function of the diameter of the liner and the winding radius on the reel.

| % elongation | Liner diameter in inches (mm) | | | |
| --- | --- | --- | --- | --- |
| | 4" (101.6) | 6" (152.4) | 8" (203.2) | 10" (254) |
| | Winding radius in metres | | | |
| 1% | 5 | 7.5 | 10 | 12.5 |
| 2% | 2.5 | 3.75 | 5 | 6.25 |
| 3% | 1.7 | 2.55 | 3.4 | 4.25 |
| 4% | 1.3 | 2 | 2.6 | 3.25 |
| 5% | 1 | 1.5 | 2 | 2.5 |

In reality, it will certainly be difficult to exceed deformation rates of 3% in view of the risks of buckling in the shell of the liner.

Reference 2 denotes a possible intermediate layer or sheet: of plastic or thin elastomer material, possibly filled with steel, glass or aramide reinforcing wires, for example. Layer 2 is designed to prevent contact of a nature that might cause the piercing between the thin inner tube and the pressure-resistant layer arranged on top of it. This layer 2 may be extruded or wound onto the inner tube 1. Whether or not this mechanically protective layer is provided will essentially depend on the service conditions under which the piping will be used, the nature of the liner material, . . .

Reference 3 denotes a layer made up of one or more metal wires arranged in a spiral substantially perpendicular to the axis of the tube, which may be clamped or not (for example rectangular steel wires, or wires of a T, Z or U shaped which can be clamped). This reinforcing layer 3 is generally referred to as the pressure arch since its size is so that it will withstand the pressure imparted by the thin tube (liner) in the case of internal pressure and withstand external pressure (collapse) since the thin tube 1 (liner) is not very strong, nor does it have an internal shell to support the external pressure, caused by hydrostatic pressure, for example. These wires are separated by a clearance in the order of 7 to 8% of the width of the wire, for example, thereby retaining the flexibility of the layer and hence the pipe. The thickness of the wires is typically selected so that this layer will be capable of withstanding both internal pressure forces and external pressure forces (breakage due to hydrostatic buckling or crushing of the wall).

Figure 3:
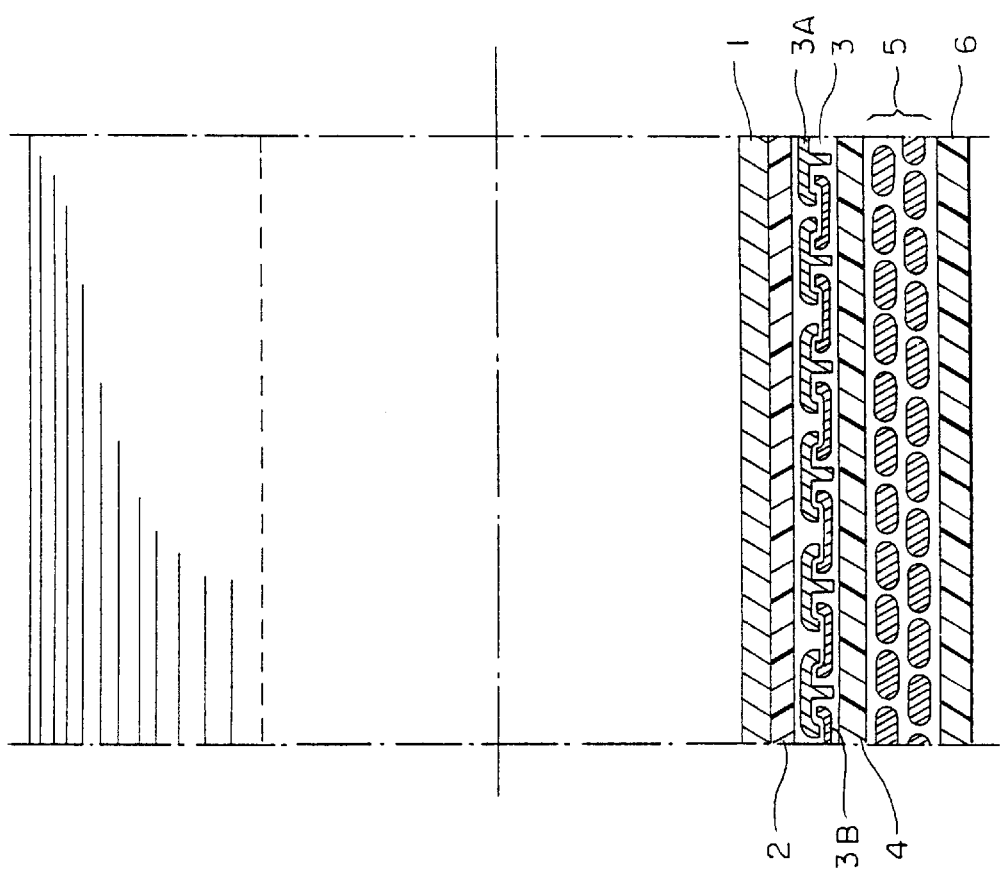
FIG. 3 shows still another embodiment of the structure wherein a pressure resistant layer has reinforcement made of wire having a T-shaped profile.

Referring now to FIG. 3, an embodiment of the invention is shown in which metal wires 3A having a T-shaped profile alternate with wires 3B having a U-shaped profile, the wires cooperating in a spiral which is clamped to form a pressure arch.

Reference denotes a sealing sheath of a thermoplastic material (of the polyamide type, for example) designed to enable the subjacent layer 3 to withstand the external pressure. The size of the above-mentioned resistant layer 3 is therefore chosen by applying pressure to the external diameter of this sheath.

Reference 5 denotes one or two layers of traction-resistant reinforcement, consisting of generally rectangular wires arranged along an elongate spiral pitch relative to the axis of the tube, for example around an angle ranging between 25° and 35°. The accuracy of this angle is to within +5° and preferably±2°. This reinforcing layer is more specifically designed to handle the sea bottom effect due to the internal pressure and/or the weight of the structure as the flexible piping is being laid.

Figure 1:
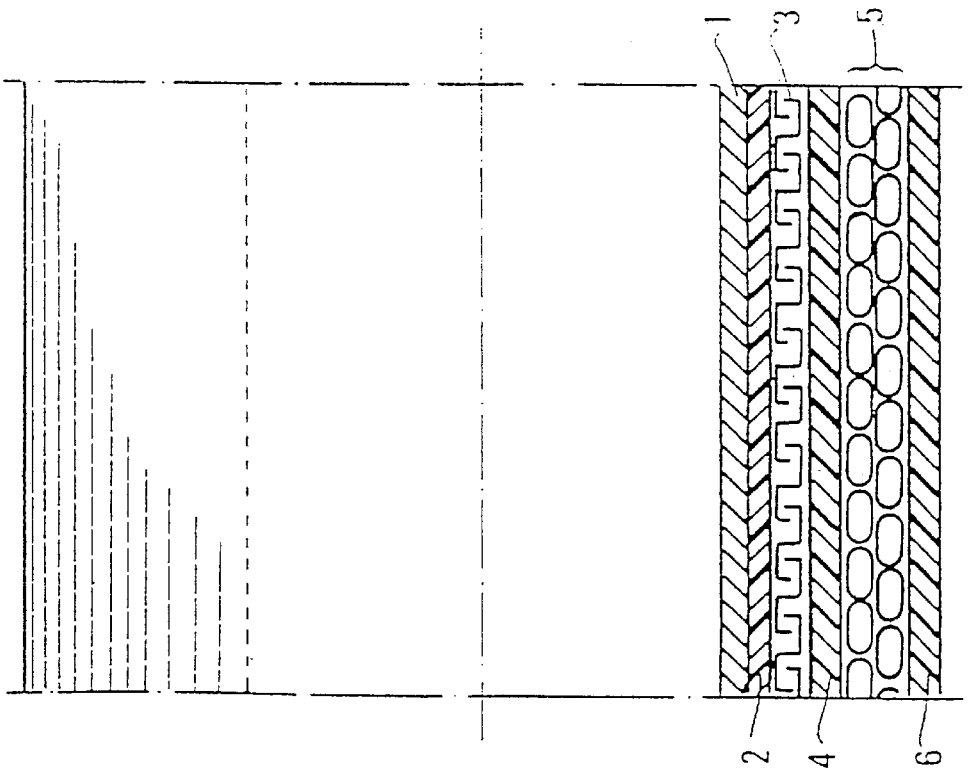
FIG. 1 shows a partial section of the elements of a structure of flexible piping as proposed by the invention.

Reference 6 denotes an outer sealing sheath, made from polyamide material, for example. The embodiment illustrated in FIG. 2 consists of the thin liner 1, the optional layer 2 in plastic and the layer 3 resistant to internal and external pressures. In this variant, the traction-resistant reinforcement 5 is arranged directly on top of the layer of circumferential wires 3. A sheath 7 to provide a seal against the external pressure was extruded around layer 5. As compared with the structure of FIG. 1, this sheath 7 fulfills the roles of sheath 4 and sheath 6. In effect, if it can be guaranteed that the sealing properties of the external sheath will be retained (6 in FIG. 1 or 7 in FIG. 2) for the purposes of the relevant application, it will not be necessary to provide two external sheaths with respect to the pressure-resistant layer 3. Furthermore, as shown in FIG. 2, the outer sheath may also be mechanically protected by means of a layer of clamped strapping 8 or any other equivalent protective layer, for example a layer of zeta wire.

The flexible pipe structure made up in this manner may have a metal liner which provides a perfect inner seal, whilst the internal pressure, external pressure and traction forces are imparted to the other reinforcing layers.

In order to understand the present invention more clearly, the difference in design as compared with conventional flexible piping will be explained.

In a conventional flexible structure consisting of an inner sealing sheath of plastic material, the first interior layer is generally a clamped strapping, the size of which is selected so as to handle the external pressure forces which might be applied to the inner sheath due to tearing of the external sheath but also as a result of the pressure of gases which may accumulate in the annulus having permeated the inner sheath.

With the present invention, it would be very difficult, for obvious reasons related to manufacture, to insert an inner layer of clamped strapping into a flex-pipe having an inner metal liner. Realistically, this liner is also, by design, too thin to absorb the external pressure forces realistically. However, there is no longer any possibility of compressed gas becoming trapped in the annulus since the metal liner provides a perfect seal. A sealing sheath to withstand external pressure can and must be placed on top of the layer of circumferentially oriented wires and preferably underneath the traction reinforcement where the sheath will be protected from attack from outside which could destroy its integrity. Consequently, the layer of circumferentially oriented wires is of such a size that it will absorb both the internal and external pressures. In the case of conventional flexible piping (with an inner sheath of a plastics material), it would be inconceivable to leave out the inner shell (clamped strapping) and arrange a sealing sheath on the circumferential layer since the pressure of the gases which have accumulated between the two sheaths would then be likely to destroy the inner sheath not supported by said shell by crushing (collapse).

Nor is it possible to conceive of introducing a thin metal liner into a known flexible pipe structure that was simplified by using reinforcement at 55°, which would absorb both the longitudinal and circumferential forces of the internal pressure. In effect, this design of reinforcement can not support the external pressure without a shell (clamped strapping, for example). Therefore, the present invention needs a layer of wires wound circumferentially, i.e. at an angle close to 90° relative to the pipe axis.

This structure can be used to advantage for servicing the transportation of petroleum on the sea bed, correctly embedded in a trench, which will then prevent the pipe from moving when subjected to a succession of pressure during service throughout the service life of the pipe.

The metal liner is designed to be compatible with the surrounding structure for the reasons set out below.

During hydraulic tests conducted on the flex-pipe after manufacture, the liner is pressed against the upper, mechanically resistant wall of the flex-pipe conforming to any circumferential and longitudinal plastic deformations; however, in view of the fact that the liner is confined and because of the admissible rate of plastic deformation in the materials selected, it will not be destroyed. After the test, the internal metal tube may even, in certain cases, have a residual deformation under compression, which will be conducive to its subsequent service life in terms of fatigue and corrosion.

When the pipeline Is laid, the liner will again be subjected to a series of elastic and plastic deformations during bending, which will be within admissible limits for the material, since these typically remain within order of a few percent as compared with admissible deformation before breaking.

Finally, throughout the period of petroleum production operations, the liner is pressed in the radial direction against the mechanical reinforcing layer and is prevented from any longitudinal displacement by the weight of its trench and the deformations to which it will be subjected in terms of fatigue will be acceptable.

If the flex-pipe is not entrenched, there is an alternative method of preventing displacements in the longitudinal direction of the liner. A known approach is to fit a flexible pipe with a layer of reinforcement which is of a sufficient quantity and size to limit longitudinal deformation under service pressure to values low enough to be compatible with the mechanical characteristics of the thin liner tube.

Example of dimensions of a flex-pipe structure with metal inner tube (liner):

Inner metal tube 1:
Diameter: 152 mm
Thickness: 2 mm
Austenitic ferritic steel
Pressure resistant layer 3:
Z-shaped wire, self-clamping of the zeta type 10
Diameter: 156 mm
Thickness: 6.2 mm
Polyamide sheath 4:
Diameter: 168.4 mm
Thickness: 2 to 4 mm
Layers of traction reinforcement 5:
Two layers of reinforcing wires crossed at angles of+35° relative to the tube axis, of a 2 mm thickness, steel with high mechanical characteristics.
Diameter: 172.4 mm to 176.4 mm
Thickness: 4 mm
External polyamide sheath 6:
Diameter: 180.4 to 184.4 mm
Thickness: 3 mm In one embodiment a layer 2 can be inserted between tube 1 and layer 3 in order to protect the punching effect of the tube under pressure. This layer is wound onto the liner or extruded. The mechanical characteristics of this layer are determined so that at high temperatures and pressures the plastic yield between the joints in the turns of the reinforcing layer is low under pressure.

The performance of this structure would allow it to reach an internal service pressure of 30 MPa and withstand an external pressure in the order of 9 MPa (corresponding to the pressure exerted under 900 m of water).

Compared with the flexible structures currently used, this structure can tolerate much higher service temperatures and the perfect seal provided by the liner overcomes the problem of the polymer sheaths of the prior art which are permeable to gases. In addition, the reinforcing can be optimized from the point of view of steel quality without having to contend with the constraints imposed by the known presence of gases which cause corrosion behind the polymer sheaths, making them more fragile. Under the same service conditions, the conventional flexible reinforcements (polymer sheath which is not gas-tight) are of comparatively much higher steel thicknesses. Consequently, only the material of the liner needs to be compatible with the nature of the effluents being transported by said pipe, whilst the other materials used do not need to be compatible with by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A reinforced, flexible piping formed about an axis comprising in a radial direction:
   a cylindrical inner continuous metal tube (1) which is impermeable to effluents conveyed by said piping, a pressure-resistant layer (3) which is capable of withstanding internal pressure from within the piping and external pressure from outside the piping, the pressure-resistant layer having reinforcement made of wire having a T-shaped profile cooperating with wire having a U-shaped profile and wound in a small-pitch spiral around said inner metal tube, and a sealing sheath (4, 6, 7) made from extruded plastic encasing the pressure-resistant layer therein.

2. Flexible piping as claimed in claim 1, in which an intermediate layer (2) of a plastic material is inserted between the inner metal tube (1) and the pressure-resistant layer (3).

3. Flexible piping as claimed in claim 2, in which said intermediate layer (2) is extruded onto the said continuous metal tube (1).

4. Flexible piping as claimed in claim 2, in which said intermediate layer (2) comprises a strip wound onto said continuous metal tube.

5. Flexible piping as claimed in claim 1, which has at least one layer of reinforcement (5) resistant to traction arranges externally to said pressure resistant layer (3).

6. Flexible piping as claimed in claim 5, in which said sealing sheath (4) is arranged between the layer (3) of pressure-resistant reinforcement and a layer (5) of reinforcement resistant to traction.

7. Flexible piping as claimed in claim 1, in which said sealing sheath (6;7) is arranged external to a layer of traction resistant reinforcement (5).

8. Flexible piping as claimed in claim 7, in which said sealing sheath (7) is externally protected by a flexible metal layer (8).

9. Flexible piping as claimed in claim 5 having two sealing sheaths, one (4) directly on the pressure-resistant layer (3) and the other underneath the layer of reinforcement (5) resistant to traction.

10. A reinforced, flexible piping formed about an axis comprising in a radial direction:
a cylindrical inner continuous metal tube (1) which is impermeable to effluents conveyed by said piping, an intermediate layer (2) of a plastic material, a pressure-resistant layer (3) disposed over the intermediate layer which is capable of withstanding internal pressure from within the piping and external pressure from outside the piping, the pressure-resistant layer having reinforcement made of wire having a T-shaped profile wound in a small-pitch spiral around said inner metal tube and a sealing sheath (4, 6, 7) made from extruded plastic encasing the pressure-resistant layer therein.

11. Flexible piping as claimed in claim 10 in which said intermediate layer (2) is extruded onto the said continuous metal tube (1).

12. Flexible piping as claimed in claim 10 in which said intermediate layer (2) comprises a strip wound onto said continuous metal tube.

13. Flexible piping as claimed in claim 10 which has at least one layer of reinforcement (5) resistant to traction arranges externally to said pressure resistant layer (3).

14. Flexible piping as claimed in claim 13 in which said sealing sheath (4) is arranged between the layer (3) of pressure-resistant reinforcement and a layer (5) of reinforcement resistant to traction.

15. Flexible piping as claimed in claim 10 in which said sealing sheath (6;7) is arranged externally to layer of traction resistant reinforcement (5).

16. Flexible piping as claimed in claim 15 in which said sealing sheath (7) is externally protected by a flexible metal layer (8).

17. Flexible piping as claimed in claim 13 having two sealing sheaths, one (4) directly on the pressure-resistant layer (3) and the other underneath the layer of reinforcement (5) resistant to traction.

\* \* \* \* \*

UNITED STATES PATENT AND TRADEMARK OFFICE
CERTIFICATE OF CORRECTION

PATENT NO. : 6,338,365 B1
DATED : January 15, 2002
INVENTOR(S) : Pierre Odru

It is certified that error appears in the above-identified patent and that said Letters Patent is hereby corrected as shown below:

<u>Column 8,</u>
Line 7, reads "as claimed 13" should read -- as claimed in claim 13 --
Line 12, reads "externally to layer" should read -- externally to a layer --

Signed and Sealed this

Eighteenth Day of March, 2003

JAMES E. ROGAN
*Director of the United States Patent and Trademark Office*